US012301775B2

(12) United States Patent
Hsiang et al.

(10) Patent No.: US 12,301,775 B2
(45) Date of Patent: May 13, 2025

(54) DISPLAY DEVICE AND OPERATING METHOD THEREOF

(71) Applicant: Acer Incorporated, New Taipei (TW)

(72) Inventors: Jui-Chieh Hsiang, New Taipei (TW); Chih-Chiang Chen, New Taipei (TW); Chao-Shih Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 49 days.

(21) Appl. No.: 18/321,782

(22) Filed: May 23, 2023

(65) Prior Publication Data

US 2024/0333900 A1 Oct. 3, 2024

(30) Foreign Application Priority Data

Mar. 31, 2023 (TW) ................. 112112536

(51) Int. Cl.
*H04N 13/383* (2018.01)
*H04N 13/122* (2018.01)
*H04N 13/161* (2018.01)
*H04N 13/398* (2018.01)

(52) U.S. Cl.
CPC ......... *H04N 13/122* (2018.05); *H04N 13/161* (2018.05); *H04N 13/383* (2018.05); *H04N 13/398* (2018.05)

(58) Field of Classification Search
CPC .. H04N 13/122; H04N 13/161; H04N 13/383; H04N 13/398
USPC ........................................................ 348/51
See application file for complete search history.

(56) References Cited

U.S. PATENT DOCUMENTS

| 10,990,167 | B1* | 4/2021 | Peuhkurinen | G06V 40/19 |
| 12,055,835 | B2* | 8/2024 | Lopez Mendez | G02F 1/294 |
| 2016/0116979 | A1* | 4/2016 | Border | G06F 3/013 |
| | | | | 345/156 |
| 2018/0081429 | A1* | 3/2018 | Akenine-Moller | G06F 3/013 |
| 2019/0041646 | A1* | 2/2019 | Amitai | G02B 27/126 |
| 2019/0179409 | A1* | 6/2019 | Jones | G02B 27/0172 |
| 2020/0050265 | A1* | 2/2020 | Krishnakumar | G06F 3/013 |

FOREIGN PATENT DOCUMENTS

| CN | 108415174 | 8/2018 |
| CN | 109640070 | 4/2019 |
| CN | 109389911 | 12/2020 |

* cited by examiner

*Primary Examiner* — Gims S Philippe
(74) *Attorney, Agent, or Firm* — JCIPRNET

(57) ABSTRACT

Disclosed are a display device and an operating method thereof. The display device includes an eye tracking circuit, a main display, an extended display, and an image processing circuit. By the eye tracking circuit disposed in the main display, the image processing circuit obtains a viewing position of eyes of a user. The image processing circuit divides an original image into a first partial image and a second partial image. The first partial image is adapted to be displayed on the main display, and the second partial image is adapted to be virtually displayed on an extended virtual display. The image processing circuit converts any pixel position on the extended virtual display into a corresponding pixel position on the extended display based on the viewing position, so as to convert the second partial image into a converted second partial image to be displayed on the extended display.

16 Claims, 3 Drawing Sheets

DISPLAY DEVICE AND OPERATING METHOD THEREOF

CROSS-REFERENCE TO RELATED APPLICATION

This application claims the priority benefit of Taiwanese application no. 112112536, filed on Mar. 31, 2023. The entirety of the above-mentioned patent application is hereby incorporated by reference herein and made a part of this specification.

BACKGROUND

Technical Field

The disclosure relates to an electronic device. In particular, the disclosure relates to a display device and an operating method thereof.

Description of Related Art

A three-dimensional (3D) display may display a stereoscopic image to a viewer based on a 3D view angle. The 3D view angle is related to positions of eyes of the viewer in front of the 3D display. In some application scenarios, two (or more) 3D displays may be tiled together to jointly display one stereoscopic image. Take two 3D displays being tiled together as an example, generally speaking, a display device may divide one stereoscopic image into a first partial image and a second partial image, a first 3D display displays the first partial image, and a second 3D display displays the second partial image. The viewer may perceive that the first partial image is not coplanar with the second partial image in a case where the first 3D display is not coplanar with the second 3D display. In other words, the viewer may perceive that the stereoscopic image is bent.

SUMMARY

The disclosure provides a display device and an operating method thereof, where a main display and an extended display respectively display a first partial image and a converted second partial image of the same original image.

In an embodiment of the disclosure, a display device includes a main display, a first eye tracking circuit, an extended display, and an image processing circuit. The first eye tracking circuit is disposed at the main display to detect eyes of a user. The image processing circuit is coupled to the first eye tracking circuit, the main display, and the extended display. The image processing circuit obtains a viewing position of the eyes of the user based on detecting of the first eye tracking circuit. The image processing circuit divides an original image into a first partial image and a second partial image. The image processing circuit controls the main display to display the first partial image. The second partial image is adapted to be displayed on an extended virtual display coplanar with the main display. The extended display is not coplanar with the main display and the extended display is located between the viewing position and the extended virtual display. The image processing circuit converts any pixel position on the extended virtual display into a corresponding pixel position on the extended display based on the viewing position, so as to convert the second partial image into a converted second partial image to be displayed on the extended display.

In an embodiment of the disclosure, an operating method includes the following. Eyes of a user are detected by a first eye tracking circuit of the display device. The first eye tracking circuit is disposed at a main display of the display device. A viewing position of the eyes of the user is obtained based on detecting of the first eye tracking circuit. An original image is divided into a first partial image and a second partial image. The main display is controlled to display the first partial image. The second partial image is adapted to be displayed on an extended virtual display coplanar with the main display. Any pixel position on the extended virtual display is converted into a corresponding pixel position on an extended display based on the viewing position, so as to convert the second partial image into a converted second partial image to be displayed on the extended display. The extended display is not coplanar with the main display and the extended display is located between the viewing position and the extended virtual display.

Based on the foregoing, the image processing circuit of the disclosure various embodiments may obtain the viewing position of the eyes of the user through the eye tracking circuit of the main display. The image processing circuit controls the main display to display the first partial image of the original image. The image processing circuit converts the second partial image of the original image into the converted second partial image based on the viewing position and the position of the extended display. The image processing circuit controls the extended display to display the converted second partial image. As a result, the viewer may perceive that the image of the main display seems to be coplanar with the image of the extended display in the case where the main display is not coplanar with the extended display. In other words, bending of the stereoscopic image jointly presented by the main display and the extended display is prevented.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
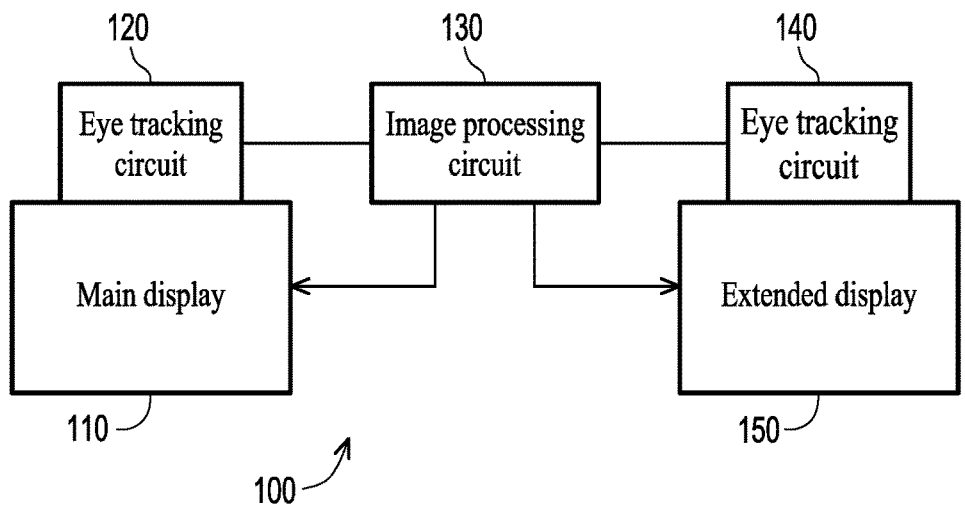
FIG. 1 is a schematic circuit block diagram of a display device according to an embodiment of the disclosure.

The term "coupling (or connection)" used throughout this specification (including the claims) may refer to any direct or indirect means of connection. For example, if it is herein described that a first device is coupled (or connected) to a second device, it should be interpreted that the first device may be directly connected to the second device, or the first device may be indirectly connected to the second device through other devices or some connection means. Terms such as "first" and "second" mentioned throughout this specification (including the claims) are used to name elements, or to distinguish between different embodiments or scopes, and are not used to limit the upper or lower bound of the number of elements, nor used to limit the sequence of elements. In addition, wherever possible, elements/members/steps using the same reference numerals in the drawings and embodiments denote the same or similar parts. Cross-reference may be made to relevant descriptions of elements/members/steps using the same reference numerals or using the same terms in different embodiments.

FIG. 1 is a schematic circuit block diagram of a display device 100 according to an embodiment of the disclosure. The display device 100 shown in FIG. 1 includes a main display 110, an eye tracking circuit 120, an image processing circuit 130, an eye tracking circuit 140, and an extended display 150. The image processing circuit 130 is coupled to the main display 110, the eye tracking circuit 120, the eye tracking circuit 140, and the extended display 150. The eye tracking circuit 140 is disposed at the extended display 150 to detect eyes of a user. The eye tracking circuit 120 is disposed at the main display 110 to detect the eyes of the user. Depending on different designs, in some embodiments, the image processing circuit 130 may be realized as a hardware circuit. In other embodiments, the image processing circuit 130 may be realized as firmware, software (i.e., programs), or a combination thereof. In still other embodiments, the image processing circuit 130 may be realized as a combination of hardware, firmware, and software forms.

In terms of hardware form, the image processing circuit 130 may be realized as a logic circuit on an integrated circuit. For example, the relevant functions of the image processing circuit 130 may be realized as various logic blocks, modules, and circuits in one or more controllers, microcontroller units (MCUs), microcontrollers, application-specific integrated circuits (ASICs), digital signal processors (DSPs), field programmable gate arrays (FPGAs), central processing units (CPUs), and/or other processing units. The relevant functions of the image processing circuit 130 may be realized as a hardware circuit, such as various logic blocks, modules, and circuits in an integrated circuit, by utilizing hardware description languages (e.g., Verilog HDL or VHDL) or other suitable programming languages.

In terms of software form and/or firmware form, the relevant functions of the image processing circuit 130 may be realized as programming codes. For example, the image processing circuit 130 is realized by utilizing general programming languages (e.g., C, C++, or assembly language) or other suitable programming languages. The programming codes may be recorded/stored in a "non-transitory machine-readable storage medium". In some embodiments, the non-transitory machine-readable storage medium includes, for example, a semiconductor memory and/or a storage device. The semiconductor memory includes a memory card, read only memory (ROM), FLASH memory, a programmable logic circuit, or other semiconductor memory. The storage device includes a hard disk drive (HDD), a solid-state drive (SSD), or other storage devices. Electronic equipment (e.g., a computer, a CPU, a controller, a MCU, or a microprocessor) may read and execute the programming codes from the non-transitory machine-readable storage medium, so as to realize the relevant functions of the image processing circuit 130.

Figure 2:
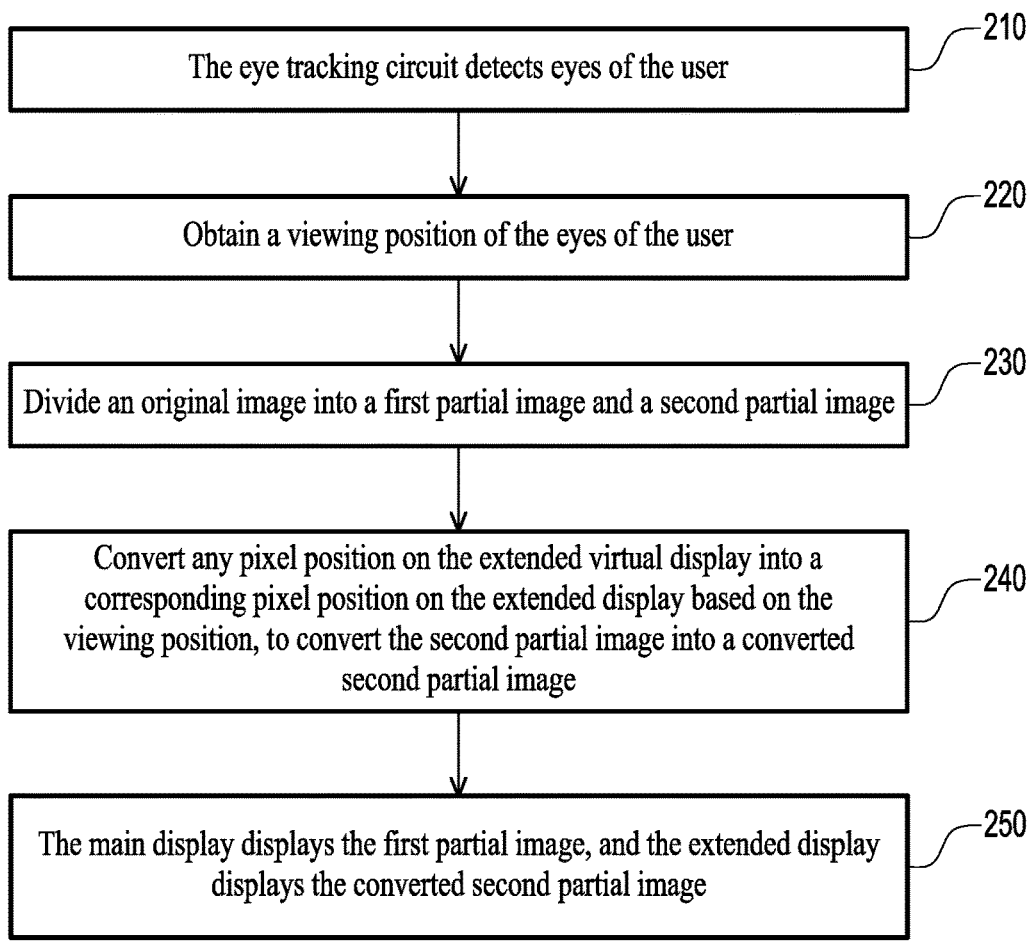
FIG. 2 is a schematic flowchart of an operating method of a display device according to an embodiment of the disclosure.

FIG. 2 is a schematic flowchart of an operating method of a display device according to an embodiment of the disclosure. In step S210, the eye tracking circuit 120 detects eyes of a user, and provides a detection result to the image processing circuit 130. In step S220, the image processing circuit 130 obtains a viewing position of the eyes of the user based on detecting of the eye tracking circuit 120. In step S230, the image processing circuit 130 may divide an original image into a first partial image and a second partial image. The first partial image is adapted to be displayed on the main display 110, and the second partial image is adapted to be displayed on an extended virtual display coplanar with the main display 110.

Figure 3:
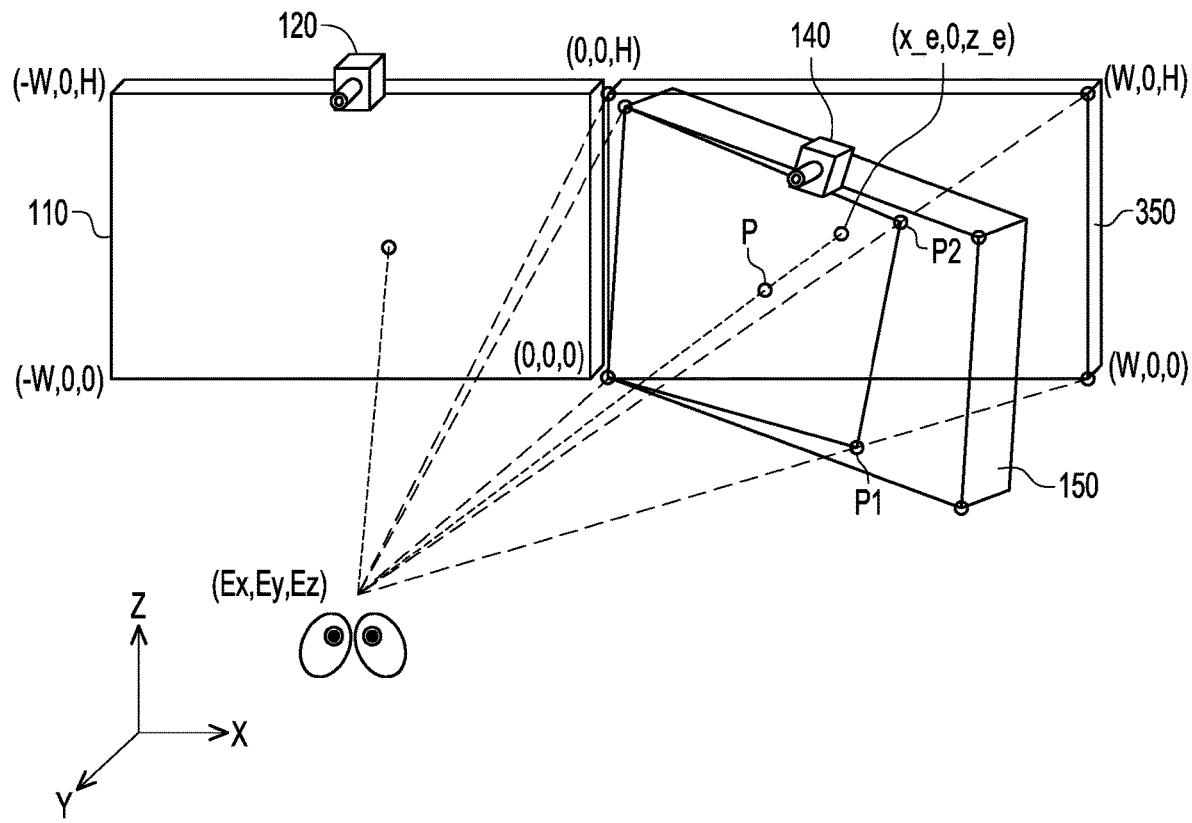
FIG. 3 is a schematic flowchart of a main display, an extended display, and an extended virtual display according to an embodiment of the disclosure.

FIG. 3 is a schematic flowchart of a main display 110, an extended display 150, and an extended virtual display 350 according to an embodiment of the disclosure. The main display 110 is coplanar with the extended virtual display 350. The extended virtual display 350 is not a physical display, that is, the extended virtual display 350 is an imaginary display. The image processing circuit 130 may divide an original image into a first partial image adapted to be displayed on the main display 110 and a second partial image adapted to be displayed on the extended virtual display 350. The eye tracking circuit 120 detects the eyes of the user, and provides the detection result to the image processing circuit 130.

As an example, the lower right corner of the main display 110 is taken as the origin (0, 0, 0) of the coordinate space shown in FIG. 3. The image processing circuit 130 obtains a viewing position (Ex, Ey, Ez) of the eyes of the user based on the detecting of the eye tracking circuit 120. If a horizontal width and a vertical height of the main display 110 are respectively W and H, the coordinates of the four corners of the main display 110 are respectively (−W, 0, H), (0, 0, H), (0, 0, 0), and (−W, 0, 0). The extended display 350 is coplanar with the main display 110. Assuming that the display size of the main display 110 is the same as the display size of the extended virtual display 350 (but not limited thereto), then the coordinates of the four corners of the extended virtual display 350 are respectively (0, 0, H), (W, 0, H), (W, 0, 0), and (0, 0, 0).

The extended display 150 is not coplanar with the main display 110, and the extended display 150 is located between the viewing position (Ex, Ey, Ez) and the extended virtual display 350. In step S240, the image processing circuit 130 converts any pixel position (x_e, 0, z_e) of the extended virtual display 350 into a corresponding pixel position P on the extended display 150 based on the viewing position (Ex, Ey, Ez). For example, based on the viewing position (Ex, Ey, Ez), the image processing circuit 130 may convert a pixel position (W, 0, H) of the upper right corner of the second partial image on the extended virtual display 350 into one corresponding pixel position P2 on the extended display 150, and convert a pixel position (W, 0, 0) of the lower right corner of the second partial image on the extended virtual display 350 into one corresponding pixel position P1 on the extended display 150. The conversion operation of the image processing circuit 130 may be any geometric calculation. Specific conversion examples will be described later.

Based on the correspondence between any pixel position (coordinates) of the extended virtual display 350 and one corresponding pixel position (coordinates) on the extended display 150, the image processing circuit 130 may convert the second partial image of the extended virtual display 350 into a converted second partial image to be displayed on the extended display 150. The image processing circuit 130 may use the correspondence between the coordinates of the extended virtual display 350 and the coordinates of the extended display 150 to carry out conventional algorithms or other algorithms, so as to convert the second partial image of the extended virtual display 350 into the converted second partial image to be displayed on the extended display 150.

In step S250, the image processing circuit 130 may control the main display 110 to display the first partial image, and control the extended display 150 to display the converted second partial image. As a result, the viewer may perceive that the image of the main display 110 seems to be coplanar with the image of the extended display 150 in the case where the main display 110 is not coplanar with the extended display 150. In other words, bending of the stereoscopic image jointly presented by the main display 110 and the extended display 150 is prevented.

A specific conversion example of the image processing circuit 130 converting the pixel position of the extended virtual display 350 into the pixel position of the extended display 150 is described here. The image processing circuit 130 obtains at least one rotation angle (e.g., an X-axis rotation angle $\theta_X$, a Y-axis rotation angle $\theta_Y$, and/or a Z-axis rotation angle $\theta_Z$) of the extended display 150 relative to the main display 110 based on the detecting of the eye tracking circuit 120 and detecting of the eye tracking circuit 140. For example, the image processing circuit 130 may use the picture captured by the eye tracking circuit 120 and the picture captured by the eye tracking circuit 140 to carry out conventional algorithms or other algorithms, so as to obtain the X-axis rotation angle $\theta_X$, the Y-axis rotation angle $\theta_Y$, and the Z-axis rotation angle $\theta_Z$ of the extended display 150 relative to the main display 110. The pictures captured by the eye tracking circuit 120 and the eye tracking circuit 140 both have a common reference object (e.g., human eyes). As a result, the image processing circuit 130 obtains the X-axis rotation angle $\theta_X$, the Y-axis rotation angle $\theta_Y$, and the Z-axis rotation angle $\theta_Z$ of the extended display 150 relative to the main display 110 based on the viewing position (Ex, Ey, Ez), the picture captured by the eye tracking circuit 120, and the picture captured taken by the eye tracking circuit 140.

The image processing circuit 130 may obtain a plane equation E of the extended display 150 based on the X-axis rotation angle $\theta_X$, the Y-axis rotation angle $\theta_Y$, and the Z-axis rotation angle $\theta_Z$ of the extended display 150 relative to the main display 110. Equation 1 below may serve as a concrete example of a spin matrix R of the extended display 150. Based on the spin matrix R, the plane equation E of the extended display 150 is Equation 2 below. Based on Equation 2, the X-axis component n1, the Y-axis component n2, and the Z-axis component n3 of the normal vector of the extended display 150 are $-\cos\theta_X * \sin\theta_Z$, $\cos\theta_X * \cos\theta_Z$, and $\sin\theta_X$, respectively.

$$R = \begin{bmatrix} \cos\theta_Z & -\sin\theta_Z & 0 \\ \sin\theta_Z & \cos\theta_Z & 0 \\ 0 & 0 & 1 \end{bmatrix} \begin{bmatrix} 1 & 0 & 0 \\ 0 & \cos\theta_X & -\sin\theta_X \\ 0 & \sin\theta_X & \cos\theta_X \end{bmatrix} \begin{bmatrix} \cos\theta_Y & 0 & \sin\theta_Y \\ 0 & 1 & 0 \\ -\sin\theta_Y & 0 & \cos\theta_Y \end{bmatrix}$$

Equation 1

$$E = n1*x + n2*y + n3*z =$$
$$(-\cos\theta_X * \sin\theta_Z)*x + (\cos\theta_X * \cos\theta_Z)*y + (\sin\theta_X)*z$$

Equation 2

The image processing circuit 130 may obtain a straight-line equation L passing through the viewing position (Ex, Ey, Ez) and any pixel position (x_e, 0, z_e) of the extended virtual display 350 based on the viewing position (Ex, Ey, Ez). For example, the straight-line equation L from any pixel position (x_e, 0, z_e) on the extended virtual display 350 to the human eye viewing position (Ex, Ey, Ez) is Equation 3 below. The image processing circuit 130 may calculate coordinates of an intersection between the straight-line equation L and the plane equation E as the corresponding pixel position on the extended display 150. When the straight-line equation L intersects the plane equation E, t is Equation 4 below. As a result, the coordinates of the intersection between the straight-line equation L and the plane equation E (i.e., the corresponding pixel position on the extended display 150 corresponding to the pixel position (x_e, 0, z_e)) is [x_e+(x_e−Ex)*t, −Ey*t, z_e+(z_e−Ez)*t], where t is [−n3*H]/[n1*(W−Ex)−n2*Ey+n3*(H−Ez)].

$$L = \begin{cases} x = x\_e + (x\_e - Ex)*t \\ y = -Ey*t \\ z = z\_e + (z\_e - Ez)*t \end{cases}, t \in R$$

Equation 3

$$t = \frac{-n3*H}{n1(W-Ex) - n2*Ey + n3(H-Ez)}$$

Equation 4

For example, the straight-line equation L from the upper right corner pixel position (W, 0, H) of the second partial image of the extended virtual display 350 to the human eye viewing position (Ex, Ey, Ez) is [x=W+(W−Ex)*t, y=−Ey*t, z=H+(H−Ez)*t], and the corresponding pixel position P2 on the extended display 150 is [W+(W−Ex)*t, −Ey*t, H+(H−Ez)*t], where t is [−n3*H]/[n1*(W−Ex)−n2*Ey+n3*(H−Ez)]. By analogy, the straight-line equation L from the lower right corner pixel position (W, 0, 0) of the second partial image of the extended virtual display 350 to the human eye viewing position (Ex, Ey, Ez) is [x=W+(W−Ex)*t, y=−Ey*t, z=−Ez*t], and the corresponding pixel position P1 on the extended display 150 is [W+(W−Ex)*t, −Ey*t, −Ez*t], where t is [n1*W]/[−n1*W+n1*Ex+n2*Ey+n3*Ez]. Based on the correspondence between any pixel position of the extended virtual display 350 and one corresponding pixel position on the extended display 150, the image processing circuit 130 may use conventional algorithms or other algorithms to convert the second partial image of the extended virtual display 350 into a converted second partial image to be displayed on the extended display 150.

Figure 4:
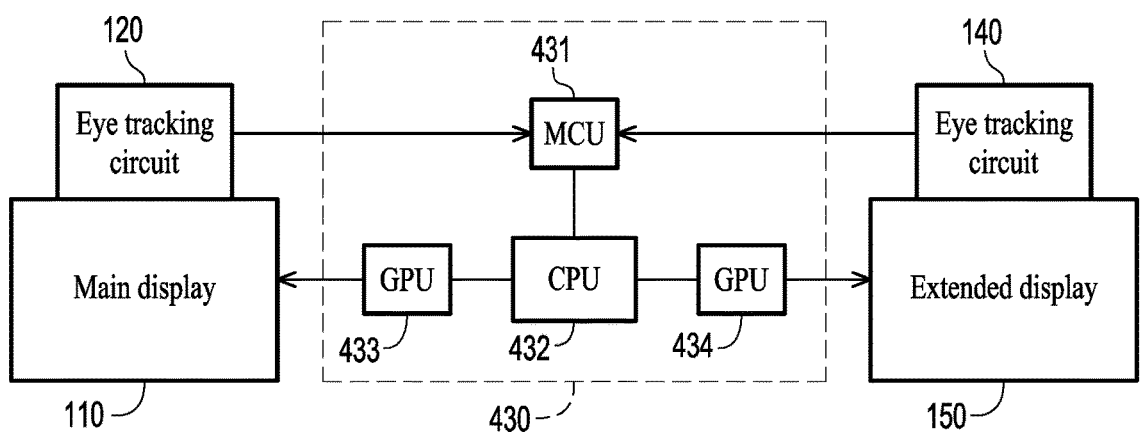
FIG. 4 is a schematic circuit block diagram of an image processing circuit according to an embodiment of the disclosure.

FIG. 4 is a schematic circuit block diagram of an image processing circuit 430 according to an embodiment of the disclosure. The image processing circuit 430 shown in FIG. 4 may be one of many embodiments of the image processing circuit 130 shown in FIG. 1. In the embodiment shown in FIG. 4, the image processing circuit 430 includes an MCU 431, a CPU 432, a graphics processing unit (GPU) 433, and a GPU 434. The MCU 431 is coupled to the eye tracking circuit 120 and the eye tracking circuit 140. The MCU 431 may obtain the viewing position (Ex, Ey, Ez) of the eyes of the user based on the detecting of the eye tracking circuit 120. The MCU 431 does not use the detection result of the eye tracking circuit 140 to obtain the viewing position (Ex, Ey, Ez). The MCU 431 may obtain the X-axis rotation angle $\theta_X$, the Y-axis rotation angle $\theta_Y$, and the Z-axis rotation angle $\theta_Z$ of the extended display 150 relative to the main display 110 based on the picture captured by eye tracking circuit 120 and the picture captured by the eye tracking circuit 140.

Figure 5:
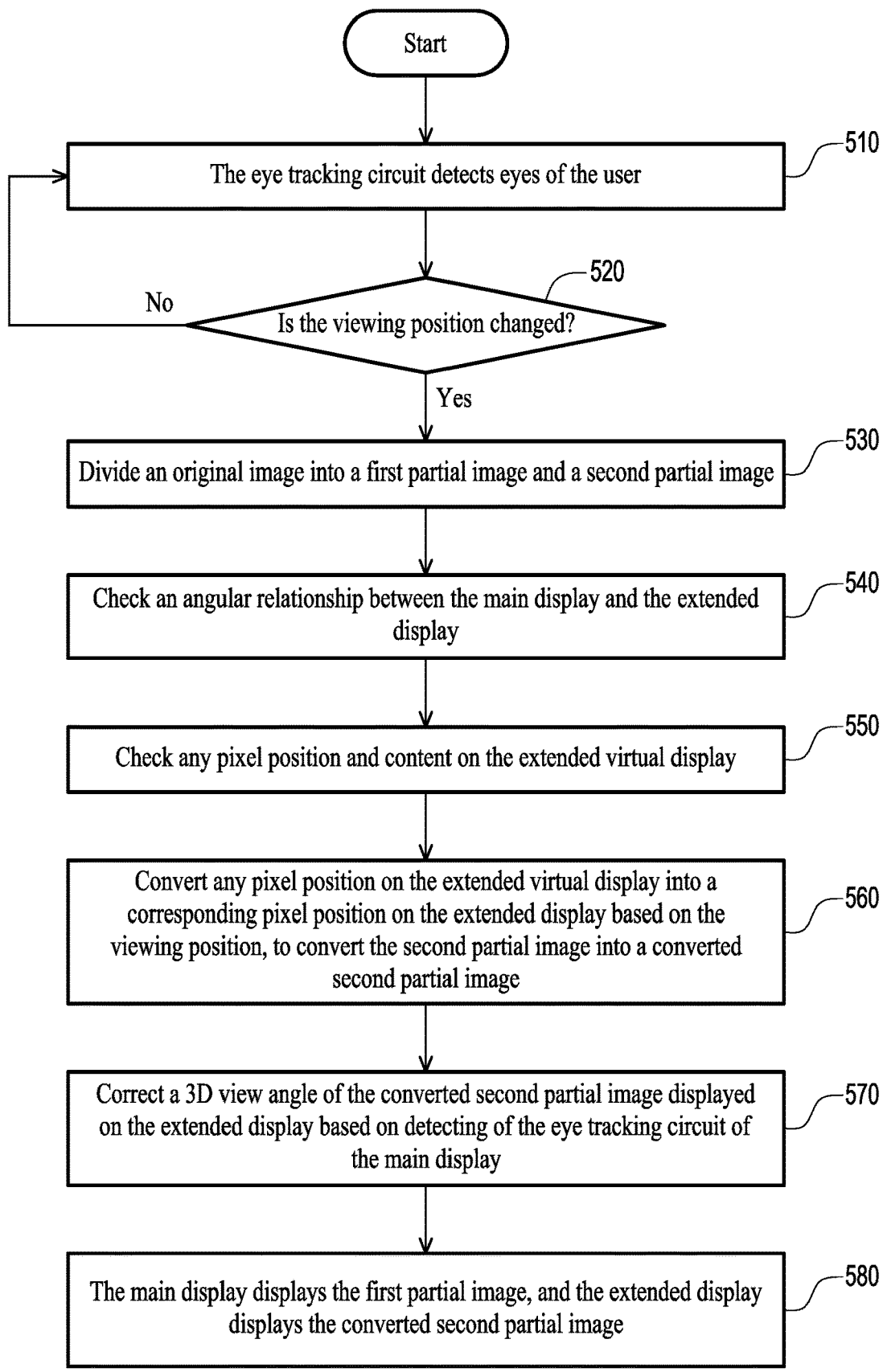
FIG. 5 is a schematic flowchart of an operating method of a display device according to another embodiment of the disclosure.

FIG. 5 is a schematic flowchart of an operating method of a display device according to another embodiment of the disclosure. In step 510, the eye tracking circuits 120 and 140 are turned on, and the MCU 431 may detect/track eyes of a user through the eye tracking circuits 120 and 140, and provide the viewing position (Ex, Ey, Ez) to the CPU 432. In step 520, the CPU 432 may determine whether the viewing position (Ex, Ey, Ez) of the eyes of the user is changed based on detecting of the eye tracking circuit 120. In step 530, the CPU 432 may define the main display 110 and the extended display 150 for the user's requirements, and set the origin (0, 0, 0) of the coordinate system. In step 530, the CPU 432 may divide an original image into a first partial image and a second partial image. The first partial image is adapted to be displayed on the main display 110, and the second partial image is adapted to be displayed on the extended virtual display 350 coplanar with the main display 110.

In step 540, the CPU 432 may check the angular relationship between the main display 110 and the extended display 150. For example, the MCU 431 may calculate and obtain the X-axis rotation angle $\theta_X$, the Y-axis rotation angle $\theta_Y$, and the Z-axis rotation angle $\theta_Z$ of the extended display 150 relative to the main display 110 based on the picture captured by the eye tracking circuit 120 and the picture captured by the eye tracking circuit 140, and provide the x-axis rotation angle $\theta_X$, the Y-axis rotation angle $\theta_Y$, and the Z-axis rotation angle $\theta_Z$ to the CPU 432. In step 550, the CPU 432 may check the position (x_e, 0, z_e) and pixel content information of each pixel on the extended virtual display 350. In step 560, the CPU 432 converts any pixel position on the extended virtual display 350 into a corresponding pixel position on the extended display 150 based on the viewing position (Ex, Ey, Ez). For example, in step 560, the CPU 432 may calculate the position of each pixel from the line of sight of the human eyes to the extended virtual display 350, and convert any pixel position on the extended virtual display 350 into a corresponding pixel position on the extended display 150. The CPU 432 may provide the content information of the corresponding pixel of the extended display 150 based on the content of any pixel of the extended virtual display 350, to further convert the second partial image of the extended virtual display 350 into a converted second partial image to be displayed on the extended display 150.

In step 570, the CPU 432 may synchronously correct or fine-tune a three-dimensional (3D) view angle of the extended display 150 based on the positional relationship between the main display 110 and the viewing position (Ex, Ey, Ez). In other words, the image processing circuit 130 may correct the 3D viewing angle of the image (the converted second partial image) displayed on the extended display 150 based on the detecting of the eye tracking circuit 120 of the main display 110. In step 580, the CPU 432 may control the main display 110 to display the first partial image through the GPU 433, and control the extended display 150 to display the converted second partial image through the GPU 434. As a result, bending of the stereoscopic image jointly presented by the main display 110 and the extended display 150 can be effectively prevented.

In summary of the foregoing, the image processing circuit in the embodiments above may obtain the viewing position (Ex, Ey, Ez) of the eyes of the user through the eye tracking circuit 120 of the main display 110. The image processing circuit controls the main display 110 to display the first partial image of the original image. The image processing circuit converts the second partial image of the original image into an image (the converted second partial image) adapted for the extended display 150 based on the viewing position (Ex, Ey, Ez) and the position of the extended display 150. The image processing circuit controls the extended display 150 to display the converted second partial image. As a result, the viewer may perceive that the image of the main display 110 seems to be coplanar with the image of the extended display 150 in the case where the main display 110 is not coplanar with the extended display 150. In other words, the image processing circuit can effectively prevent unexpected bending of the stereoscopic image jointly presented by the main display 110 and the extended display 150.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display device comprising:
    a main display;
    a first eye tracking circuit disposed at the main display to detect eyes of a user;
    an extended display; and
    an image processing circuit coupled to the first eye tracking circuit, the main display, and the extended display, wherein the image processing circuit obtains a viewing position of the eyes of the user based on detecting of the first eye tracking circuit, the image processing circuit divides an original image into a first partial image and a second partial image, the image processing circuit controls the main display to display the first partial image, the second partial image is adapted to be displayed on an extended virtual display coplanar with the main display, the extended display is not coplanar with the main display and the extended display is located between the viewing position and the extended virtual display, and the image processing circuit converts any pixel position on the extended virtual display into a corresponding pixel position on the extended display based on the viewing position, so as to convert the second partial image into a converted second partial image to be displayed on the extended display.

2. The display device according to claim 1, wherein the image processing circuit corrects a three-dimensional view angle of the converted second partial image displayed on the extended display based on the detecting of the first eye tracking circuit of the main display.

3. The display device according to claim 1, further comprising:
    a second eye tracking circuit disposed at the extended display to detect the eyes of the user, wherein the image processing circuit obtains at least one rotation angle of the extended display relative to the main display based on the detecting of the first eye tracking circuit and detecting of the second eye tracking circuit.

4. The display device according to claim 1, wherein the image processing circuit obtains a plane equation of the extended display based on at least one rotation angle of the extended display relative to the main display, the image processing circuit obtains a straight-line equation passing through the viewing position and the any pixel position of the extended virtual display based on the viewing position, and the image processing circuit calculates coordinates of an intersection between the straight-line equation and the plane equation as the corresponding pixel position on the extended display.

5. The display device according to claim 4, wherein the at least one rotation angle of the extended display relative to the main display comprises an X-axis rotation angle $\theta_X$, a Y-axis rotation angle $\theta_Y$, and a Z-axis rotation angle $\theta_Z$, and a spin matrix R of the extended display is $$\begin{bmatrix} \cos\theta_Z & -\sin\theta_Z & 0 \\ \sin\theta_Z & \cos\theta_Z & 0 \\ 0 & 0 & 1 \end{bmatrix} \begin{bmatrix} 1 & 0 & 0 \\ 0 & \cos\theta_X & -\sin\theta_X \\ 0 & \sin\theta_X & \cos\theta_X \end{bmatrix} \begin{bmatrix} \cos\theta_Y & 0 & \sin\theta_Y \\ 0 & 1 & 0 \\ -\sin\theta_Y & 0 & \cos\theta_Y \end{bmatrix}.$$

6. The display device according to claim 4, wherein the at least one rotation angle of the extended display relative to the main display comprises an X-axis rotation angle $\theta_X$, a Y-axis rotation angle $\theta_Y$, and a Z-axis rotation angle $\theta_Z$.

7. The display device according to claim 6, wherein the plane equation is n1*x+n2*y+n3*z=(−cos $\theta_X$*sin $\theta_Z$)*x+(cos $\theta_X$*cos $\theta_Z$)*y+(sin $\theta_X$)*z, n1 is an X-axis component of a normal vector of the extended display, n2 is an Y-axis component of the normal vector, n3 is an Z-axis component of the normal vector, the X-axis component n1 is −cos $\theta_X$*sin $\theta_Z$, the Y-axis component n2 is cos $\theta_X$*cos $\theta_Z$, the Z-axis component n3 is sin $\theta_X$, the viewing position is [Ex, Ey, Ez], the any pixel position of the extended virtual display is [x_e, 0, z_e], the straight-line equation is [x=x_e+(x_e−Ex)*t, y=−Ey*t, z=z_e+(z_e−Ez)*t], the coordinates of the intersection are [x_e+(x_e−Ex)*t, −Ey*t, z_e+(z_e−Ez)*t], t is [−n3*H]/[n1*(W−Ex)−n2*Ey+n3*(H−Ez)], H is a vertical height of the second partial image, and W is a horizontal width of the second partial image.

8. The display device according to claim 7, wherein t is $$\frac{-n3*H}{n1(W-Ex)-n2*Ey+n3(H-Ez)}$$

when the straight-line equation intersects the plane equation.

9. An operating method of display device, comprising:
  detecting eyes of a user by a first eye tracking circuit of the display device, wherein the first eye tracking circuit is disposed at a main display of the display device;
  obtaining a viewing position of the eyes of the user based on detecting of the first eye tracking circuit;
  dividing an original image into a first partial image and a second partial image;
  controlling the main display to display the first partial image, wherein the second partial image is adapted to be displayed on an extended virtual display coplanar with the main display; and
  converting any pixel position on the extended virtual display into a corresponding pixel position on an extended display based on the viewing position, so as to convert the second partial image into a converted second partial image to be displayed on the extended display, wherein the extended display is not coplanar with the main display and the extended display is located between the viewing position and the extended virtual display.

10. The operating method according to claim 9, further comprising:
  correcting a three-dimensional view angle of the converted second partial image displayed on the extended display based on the detecting of the first eye tracking circuit of the main display.

11. The operating method according to claim 9, further comprising:
  obtaining at least one rotation angle of the extended display relative to the main display based on the detecting of the first eye tracking circuit and detecting of a second eye tracking circuit of the display device, wherein the second eye tracking circuit is disposed at the extended display to detect the eyes of the user.

12. The operating method according to claim 9, further comprising:
  obtaining a plane equation of the extended display based on at least one rotation angle of the extended display relative to the main display;
  obtaining a straight-line equation passing through the viewing position and the any pixel position of the extended virtual display based on the viewing position; and
  calculating coordinates of an intersection between the straight-line equation and the plane equation as the corresponding pixel position on the extended display.

13. The operating method according to claim 12, wherein the at least one rotation angle of the extended display relative to the main display comprises an X-axis rotation angle $\theta_X$, a Y-axis rotation angle $\theta_Y$, and a Z-axis rotation angle $\theta_Z$, and a spin matrix R of the extended display is $$\begin{bmatrix} \cos\theta_Z & -\sin\theta_Z & 0 \\ \sin\theta_Z & \cos\theta_Z & 0 \\ 0 & 0 & 1 \end{bmatrix} \begin{bmatrix} 1 & 0 & 0 \\ 0 & \cos\theta_X & -\sin\theta_X \\ 0 & \sin\theta_X & \cos\theta_X \end{bmatrix} \begin{bmatrix} \cos\theta_Y & 0 & \sin\theta_Y \\ 0 & 1 & 0 \\ -\sin\theta_Y & 0 & \cos\theta_Y \end{bmatrix}.$$

14. The operating method according to claim 12, wherein the at least one rotation angle of the extended display relative to the main display comprises an X-axis rotation angle $\theta_X$, a Y-axis rotation angle $\theta_Y$, and a Z-axis rotation angle $\theta_Z$.

15. The operating method according to claim 14, wherein the plane equation is n1*x+n2*y+n3*z=(−cos $\theta_X$*sin $\theta_Z$)*x+(cos $\theta_X$*cos $\theta_Z$)*y+(sin $\theta_X$)*z, n1 is an X-axis component of a normal vector of the extended display, n2 is an Y-axis component of the normal vector, n3 is an Z-axis component of the normal vector, the X-axis component n1 is −cos $\theta_X$*sin $\theta_Z$, the Y-axis component n2 is cos $\theta_X$*cos $\theta_Z$, the Z-axis component n3 is sin $\theta_X$, the viewing position is [Ex, Ey, Ez], the any pixel position of the extended virtual display is [x_e, 0, z_e], the straight-line equation is [x=x_e+(x_e−Ex)*t, y=−Ey*t, z=z_e+(z_e−Ez)*t], the coordinates of the intersection are [x_e+(x_e−Ex)*t, −Ey*t, z_e+(z_e−Ez)*t], t is [−n3*H]/[n1*(W−Ex)−n2*Ey+n3*(H−Ez)], H is a vertical height of the second partial image, and W is a horizontal width of the second partial image.

16. The operating method according to claim 15, wherein t is $$\frac{-n3*H}{n1(W-Ex)-n2*Ey+n3(H-Ez)}$$

when the straight-line equation intersects the plane equation.

* * * * *